(12) United States Patent
Höhne et al.

(10) Patent No.: US 6,942,246 B2
(45) Date of Patent: Sep. 13, 2005

(54) PASSENGER PROTECTION DEVICE IN A MOTOR VEHICLE WITH AN AIRBAG MODULE

(75) Inventors: Frank Höhne, Ingolstadt (DE); Krönes Walter, Ingolstadt (DE)

(73) Assignee: Audi AG (DE)

( * ) Notice: Subject to any disclaimer, the term of this patent is extended or adjusted under 35 U.S.C. 154(b) by 200 days.

(21) Appl. No.: 10/333,589

(22) PCT Filed: Aug. 17, 2001

(86) PCT No.: PCT/EP01/09494
§ 371 (c)(1),
(2), (4) Date: Jan. 24, 2003

(87) PCT Pub. No.: WO02/18181
PCT Pub. Date: Mar. 3, 2002

(65) Prior Publication Data
US 2003/0151235 A1 Aug. 14, 2003

(30) Foreign Application Priority Data
Aug. 30, 2000 (DE) ........................ 100 42 527

(51) Int. Cl.[7] .............................................. B60R 21/16
(52) U.S. Cl. ................................... 280/731; 280/728.3
(58) Field of Search .............................. 280/731, 728.3

(56) References Cited

U.S. PATENT DOCUMENTS 4,828,286 A    5/1989  Fohl ........................... 280/731
5,125,682 A    6/1992  Hensler et al. ............. 280/730
2001/0038195 A1 * 11/2001 Cuevas et al. .......... 280/728.2

FOREIGN PATENT DOCUMENTS

| DE | 40 10 767 A1 | 4/1990 | ........... B60R/21/16 |
| DE | 19617758 | 11/1997 | ........... B60R/21/20 |
| DE | 197 42 506 A1 * | 1/1999 | |
| DE | 197 49 914 A1 * | 5/1999 | |
| DE | 19904072 | 3/2000 | ........... B60R/21/20 |
| WO | WO 97/34783 | 9/1997 | ........... B60R/21/20 |

* cited by examiner

*Primary Examiner*—Ruth Ilan
(74) *Attorney, Agent, or Firm*—Stevens, Davis, Miller & Mosher, LLP

(57) ABSTRACT

The invention relates to a passenger protection device on the steering wheel (2) of a motor vehicle, comprising a steering wheel airbag module which is arranged behind the cap (1) of the hub of a steering wheel, containing at least one steering wheel airbag (10; 28; 39) and at least one gas generator. The hub cap (1) has a fixed center area (8; 21; 29) acting as a first wall area around which a second wall area (7; 24; 33) which is directly adjacent to an edge area (12; 23; 31) is arranged. When the airbag is activated, an annular gap (5) can be formed in the second wall area (7; 24; 33) around the fixed center area (8; 21; 23), the steering wheel airbag (10; 28; 39) being embodied in a correspondingly ring-shaped manner with a tubular area (11) which is associated with the annular gap (5) and extends therefrom when inflated. According to the invention, the annular gap (5) can be formed directly around the fixed center area (8; 21; 29) when the airbag is activated by expanding and/or tearing open at least the adjacent edge area (12; 23; 31) of the second wall area (7; 24; 33).

19 Claims, 2 Drawing Sheets

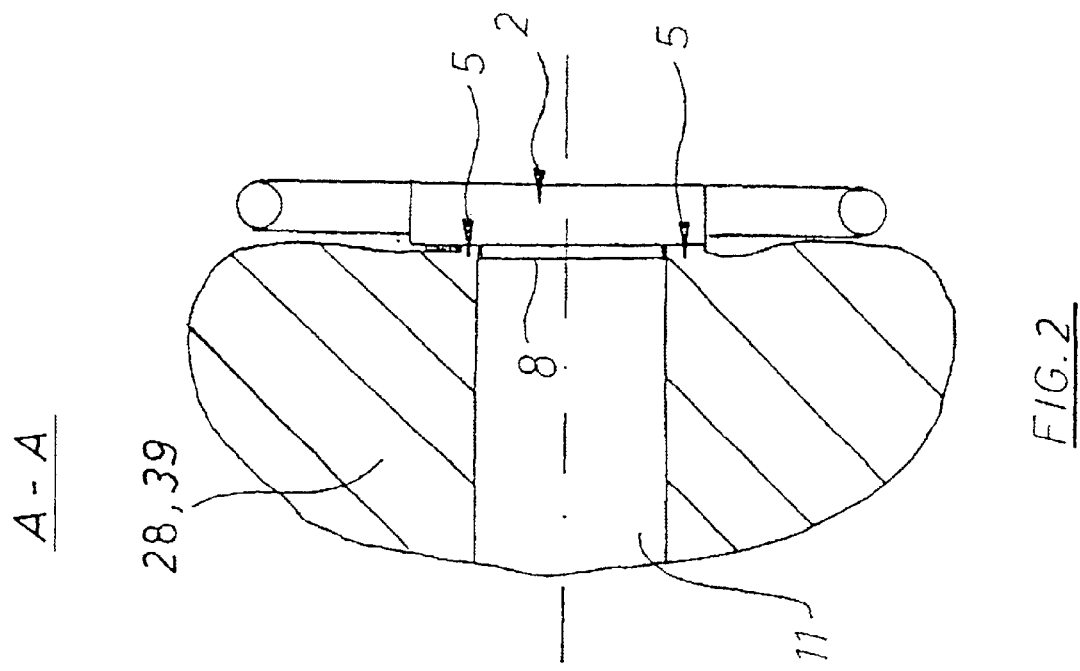
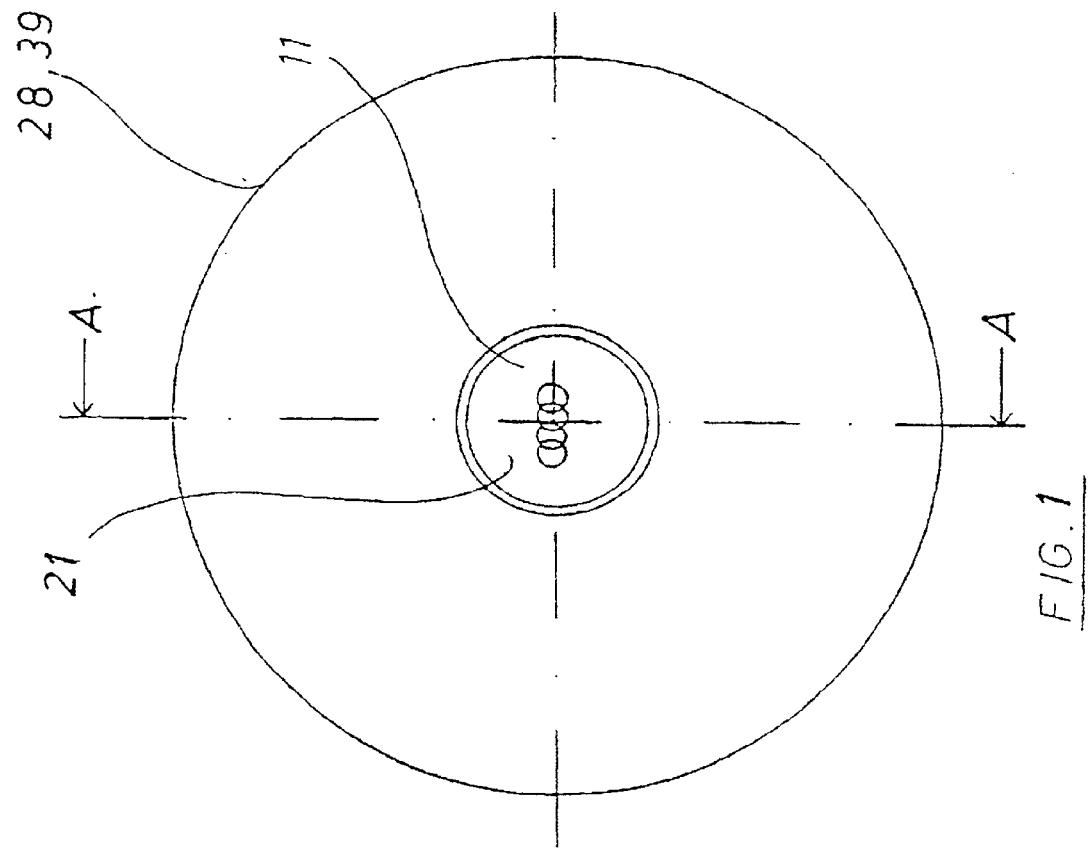

PASSENGER PROTECTION DEVICE IN A MOTOR VEHICLE WITH AN AIRBAG MODULE

The invention relates to a passenger protection device in a motor vehicle with an airbag module.

BACKGROUND OF THE INVENTION

A disclosed passenger protection device in a motor vehicle with an airbag module which is mounted behind a wall area and contains at least one folded airbag and at least one gas generator (DE 196 17 758 C1) comprises a covered exit opening in the wall area which may be opened by application of pressure for the airbag which is opened after activation.

The exit opening is covered in this instance by a cover cap which may be lifted from a closed position to a clearing position permitting emergence of the airbag opening under pressure. In addition, a rebound strap mounting is provided for the cover cap. The cover cap may in this instance be forced out of an airbag cover in the wall area enclosing the cover cap. In order to enlarge this opening predetermined yield lines are provided which extend more or less radially from the airbag exit opening in the wall area. The movement of a cover cap which has been forced out and lifted is relatively uncontrolled in the area delimited by the length of the rebound strap, as a result of which these cover caps may exhibit greater aggressive behavior toward a vehicle passenger. A relatively large opening diameter is required for the purpose of airbag emergence, a diameter which is unimpeded to the greatest extent possible, with the result that the removable cover cap will accordingly also be relatively large in diameter. Consequently, freedom of configuration is constrained toward smaller diameters for the cover caps such as are required, for example, in the steering wheel hub area in the case of a steering wheel airbag. But it is also to be noted in this connection that smaller lift-offcover caps may additionally exhibit more aggressive behavior toward a passenger.

A similar design is also disclosed by DE 40 10 767 A1.

DE 197 49 914 A1 also discloses a passenger protection device on a steering wheel of a vehicle with a steering wheel airbag module, the steering wheel airbag module being mounted behind a hub cover of a steering wheel hub and containing at least one folded steering wheel airbag and at least one gas generator. The hub cover has a stationary center area as first wall area around which is mounted a second wall area immediately adjacent to an edge connecting area. A predetermined circular yield line mounted concentrically with the stationary center area is provided in the second wall area, spaced a certain distance from the stationary center area and thus spaced a certain distance from the edge connection area. In addition, there is formed in the second wall area a plurality of radially extending predetermined opening lines which extend radially from the edge connection area of the second wall area into an area over the predetermined opening line moving in a circle, so that individual flap areas are formed on the hub cover. In the event of airbag activation, the airbag inflating in a circle around the stationary center area exerts pressure from below on the second wall area such that the individual predetermined opening lines move apart and so clear an annular gap around the stationary center area for airbag emergence. The second wall area moves apart in such a way that the annular gap is formed at a certain distance from the stationary center area more or less in the area of the predetermined opening line by the individual opening flap areas.

With a design such as this a removable cover flap may be eliminated, since the wall area enclosed in the annular gap may remain stationary as center area. The hub cover is in this instance made of a plastic material making it possible to provide the individual predetermined yield points of the predetermined opening lines on the inside of the cover so as not to be visible from the exterior. However, a design such as this of the hub cover with predetermined opening lines is possible only with certain plastic materials. In particular, in the case of high-quality vehicle interior equipment the desire still exists for use of other high-quality materials such as leather, textile or fabric material, etc. in conjunction with the design of steering wheel covers and so hub covers. However, a problem arises with such high-quality materials, in that in this instance predetermined opening lines or predetermined yield points are undesirably visible from outside, that is, from the visible side. This leads to an impression altogether of lower quality and so lowers the overall optical impression, especially in the case of high-quality vehicle interior accouterments. In addition, the cover is possibly also damaged as a result. Consequently, a design such as this of a passenger protection device on a steering wheel with such predetermined opening lines is scarcely workable when use is made of the materials in question for hub and steering wheel covers and so the potential for their use can only be restricted.

In addition, such production of predetermined opening lines by means of individual predetermined yield points also entails considerable cost for production engineering, so that production is also relatively expensive in the aggregate.

A passenger protection device on a steering wheel of a vehicle in which a plurality of different materials, in particular also high-quality leather and/or fabric materials, may be used as hub and/or steering wheel covers is disclosed in generic WO 97/43783. In the case of this passenger protection device a steering wheel airbag module is mounted behind a hub cover of a steering wheel hub and has at least one folded steering wheel airbag and at least one gas generator. The hub cover has a stationary center area as first wall area around which is mounted a second edge area with immediately adjoining edge connection area. In the event of airbag activation an annular gap may he formed around the stationary center area in the second wall area, the steering wheel airbag being correspondingly circular with a tubular area associated with the annular gap and emerging from it when the bag is in the inflated state. The annular gap may in the event of airbag activation be formed immediately around the stationary center area through expansion and/or opening at least of the edge connection area of the second wall area.

Specifically, in this instance the edge connection area of the second wall area rests against the stationary center area from below, that is, the edge connection area of the second wall area is overlapped by an edge area of the stationary center area. When the airbag is activated, the inflating airbag presses the second wall area, and especially the edge connection area, outward and so away from the configuration connection below the stationary center area for clearing of the annular gap. In this configuration, if the passenger protection device has not been activated the danger exists that as a result of improper treatment, such as pushing on the area of the second wall area, the second wall area will be raised by the stationary center area and undesired access to the area of the airbag or the airbag module is cleared as a result. In addition, a certain undesirable danger of manipulation is also created, especially if the second wall area is made of a material which is relatively flexible.

A similar configuration with the same disadvantages is also disclosed in U.S. Pat No. 4,828,286, in which the edge connection area of the second wall area rests on the edge area of the stationary center area.

SUMMARY OF THE INVENTION

Consequently, the object of the invention is further to develop a generic passenger protection device in such a way that the danger of undesired lifting of the edge connection area from the stationary center area may be prevented when the passenger protection device is in the unactivated state.

This object is attained by the claimed invention whereby the edge connection area of the second wall area is clamped on the stationary center area when the passenger protection device has not be activated, it being possible for the edge connection area to be extracted by the inflating airbag from the clamping and be expanded and/or opened around the stationary center element by the inflating airbag for formation of the annular gap.

The disadvantages indicated above can be prevented to advantage by such clamping of the edge connection area when the passenger protection device on the center area has not been activated, since the edge connection area is as a result retained on the stationary center area. The clamping is designed so that the edge connection area may be extracted from the clamping by the inflating airbag when the passenger protection device has been activated.

In addition, no predetermined opening lines or predetermined yield points need be produced with such a design, so that the production cost is reduced and accordingly simple and low-cost production is on the whole possible. In particular, however, materials such as leather and/or fabrics creating the impression of high quality may be used in conjunction with hub and steering wheel covers without impairment of or possibly even damage to the visual aspect of such covers in an optically unseemly manner, something which is incompatible especially with the requirements set for high-quality vehicle interior accouterments. In a preferred embodiment the second wall area is accordingly designed at least in part as a leather cover.

In one specific embodiment in this context, the stationary center area, preferably designed to be bending resistant and dimensionally stable with a center edge area, rests on the edge connection area of the second wall area. The edge connection area is clamped between the center edge area and a clamping element preferably mounted so as to be bending resistant and dimensionally stable. In a configuration such as this the edge connection area is extracted from the clamping by the inflating airbag, at least the edge connection area being expandable and/or openable for formation of the annular gap around the stationary center element.

An especially effective clamping is obtained by means which specifies that the clamping element supports or clamps the edge connection area as viewed from the airbag module by means of a clamping element edge area.

In one especially preferred specific embodiment the stationary center area is laminar in form and may be fastened by a central and more or less vertically oriented pin extension on the airbag module, preferably on the diffusor. The clamping element is trough like, with a tub edge as clamping element edge area and has a central opening through which the pin extension of the stationary center area extends, preferably so as to be positive locking. A configuration such as this may be produced by simple and cost-effective means which ensures high operational reliability.

In one alternative embodiment the preferably bending resistant and dimensionally stable stationary center area has a circumferential groove on a circumferential surface into which the edge connection area of the second wall area may be clamped, in such a way that the edge connection area may be extracted by the inflating airbag from the circumferential groove and may be expanded and/or opened around the center element by the inflating airbag for formation of the annular gap. It is advantageous that a reduced component cost is obtained in this instance, since the stationary center area is used in a dual function at the same time also for fastening the edge connection area or snapping it in.

Stationary center areas such as this may be produced, for example, integrally with ornamental elements. As an alternative it is also possible, however, to snap, crimp, or glue separate emblems to the stationary center area.

Another embodiment specifies that the stationary center area rests on the airbag module housing, preferably a diffusor, for orientation with feet, the stationary center area being fastenable by way of a central and more or less vertically oriented pin extension on the airbag module housing, preferably on the diffusor, preferably by threaded connection. Proper seating of the stationary center area by simple means is ensured also in the case of an edge connection area snapped into the circumferential area of the stationary center area.

Theoretically the stationary center area may be produced by various ways and means, preferably, however, in the form of a cast or extruded part.

It is advisable for the first wall area, preferably a stationary ornamental cap, forming the stationary center area surrounding the annual gap to be rigidly connected to the subjacent airbag module housing. Depending on the actual circumstances, at least one part of a housing wall of the airbag module could also form the stationary center area as a visible surface. In particular, additional configuration potential results from a combination of visible surfaces with ornamental caps and/or emblems. For the sake emergence of the airbag as unimpeded as possible, it is advisable for the annular gap to be more or less circular in shape so that it encloses a first wall area correspondingly more or less circular in shape. In this way such a design may be adapted to advantage to a conventional basic hub shape of a steering wheel. Strictly speaking, however, a rectangular configuration of the annular gap is also possible, the annular airbag then being correspondingly rectangular in shape.

Another embodiment specifies that a cover-like central ornamental cap may also be included for the sake of specific airbag exit behavior, in that an edge area of the ornamental cap could be folded upward, optionally by the airbag forcing its way out, for the purpose of enlargement of the annular gap and of formation of a guide surface.

According to another embodiment, an exit annular channel is formed for the airbag which is bounded by channel walls. The exit behavior of the airbag may also be affected in a predetermined manner by imparting a specific shape to these channel walls. For example, tapering of the annular exit channel toward the annular gap has the effect of delaying emergence of the airbag.

A further embodiment specifies that the stationary center area is in the form of a stationary ornamental cap. The annular gap may be relative large in size for purposes of unimpeded airbag exit, so that a relatively small ornamental cap is possible, this leaving free spaces for design. Thus, because of its stationary mounting the ornamental cap may now be used to advantage for mounting of operating and design elements such as push buttons, wooden trim, or even a video screen. In addition, the concept for mounting the airbag module advantageously no longer depends on the cap design, but may be freely selected, for example, by an ancillary company, the airbag being folded, for example, into the ornamental cap or into the gas generator carrier. Another free structural and design space is thereby created by such a configuration.

In order to affect a certain amount of protection in the event of a secondary collision, another embodiment specifies that the stationary center area, preferably an ornamental cap, have insulating material, preferably a foam material, placed beneath it.

BRIEF DESCRIPTION OF THE DRAWINGS

The invention is discussed in greater detail in what follows with reference to drawings, in which:

FIG. 1 shows a schematic top view of a hub cover with airbag unfolded,

FIG. 2 shows a schematic cross-sectional view along line A—A of FIG. 1,

DETAILED DESCRIPTION OF THE INVENTION

Figure 3:
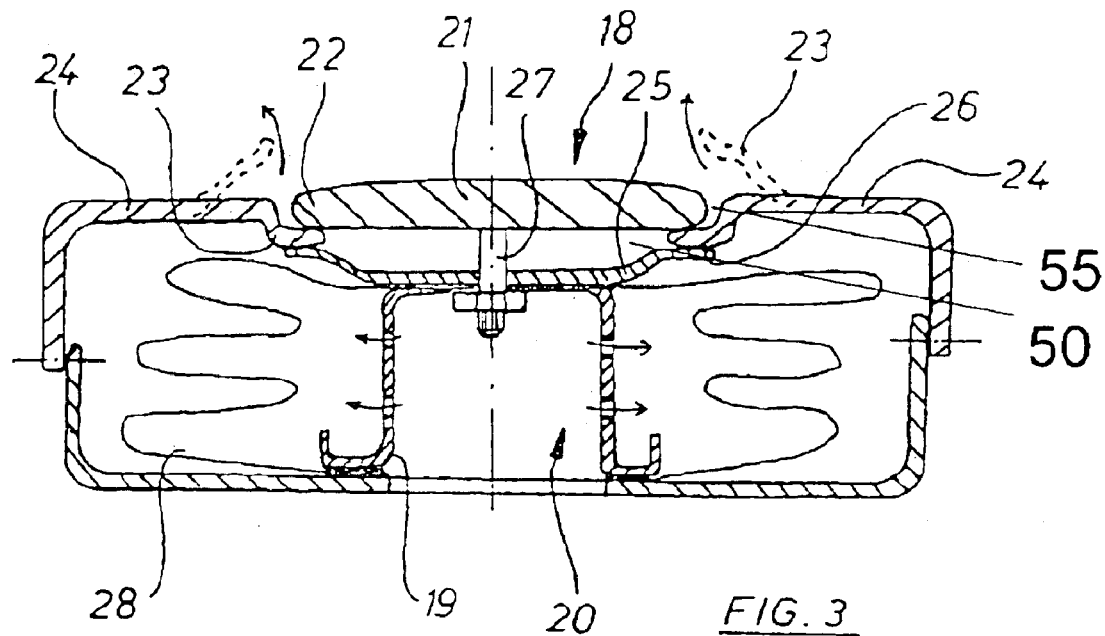
FIG. 3 shows a schematic cross-section through a first, specific embodiment of a passenger protection device.

FIG. 3 illustrates a first, specific, embodiment of a hub cover 18 of a steering wheel 2 in which the stationary center area forming the first wall area of the hub cover 18 is in the form of an ornamental cap 21 which may be rigidly connectible to a diffusor 19 of an airbag module 20 and is preferably bending resistant and dimensionally stable. The ornamental cap 21 rests by a center edge area 22 on an edge connection area 23 of a second wall area 24 of the hub cover 18. The edge connection area 23 is clamped between the center edge area 22 and a stationary and preferably bending resistant and dimensionally stable clamping element 25, such clamping element 25 supporting the edge connection area 23 as seen from the direction of the airbag module 20 by a clamping element edge area 26. The clamping element 25 is in this instance more or less trough-like in design, while the ornamental cap 21 is laminar in form and is fastened by a central and more or less vertically oriented pin extension 27 to the diffusor 19. The clamping element 25 also has a central opening through which the pin extension 27 of the ornamental cap 21 extends, preferably affecting positive locking. Additionally, below the stationary area, preferably below the ornamental cap 21, an insulating material 50 may be positioned. This insulating material is preferably a foam material, and the second wall area 24, 33 may be at least in part in the form of a leather cover. There may also be formed below the annular gap an annular exit channel 55 which is bounded by channel walls a shape of which is adapted to a predetermined exit behavior of the airbag.

In the event of airbag activation air is blown into a circular airbag 28 by way of the diffusor, as is indicated schematically by the arrows in FIG. 3. The edge connection area 23 is extracted from the clamping between the ornamental cap 21 and the clamping element 25 by the inflating airbag, the hub cover 18 being expanded and/or opened immediately around the ornamental cap 21 in the edge connection area 23 to form an annular gap 5, as is indicated here only by broken lines and very schematically.

Figure 4:
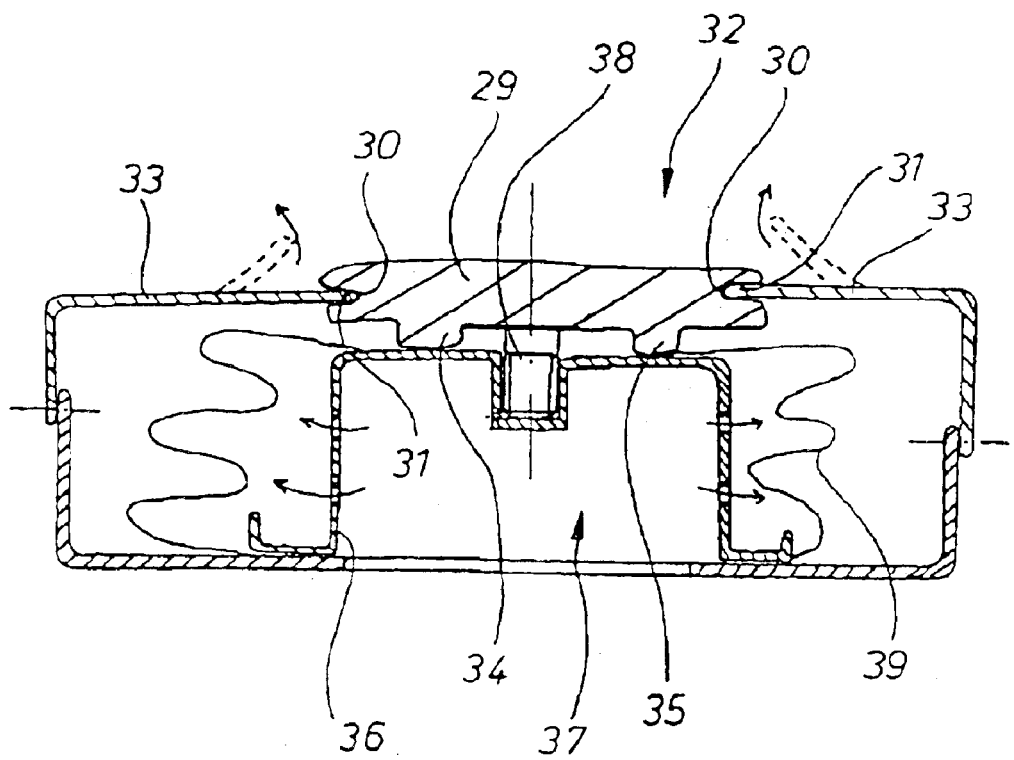
FIG. 4 shows a schematic cross-section through another embodiment of a passenger protection device claimed for the invention.

FIG. 4 illustrates another alternative embodiment which differs from that shown in FIG. 3 in that an ornamental cap 29 in this instance has a circumferential groove 30 on a circumferential surface, a groove into which an edge connection area 31 of a second wall area 33 of a hub cover 32 is snapped or clamped. The ornamental gap 29 rests for the purpose of orientation with feet 34, 35 on a diffusor 36 of an airbag module 37 and is detachably joined by a threaded connection to the diffusor 36 by way of a pin extension 38.

In the event of airbag activation the edge connection area 31 is in this instance extracted from the circumferential groove 30 by an inflating annular airbag 39, as a result of which the hub cover 32 in the edge connection area 31 is expanded and/or opened immediately around the ornamental cap 29 to form an annular gap, something indicated here only by broken lines and very schematically.

The inflated state of the airbag 28,39 is illustrated schematically in a top view in FIG. 1, while FIG. 2 presents a schematic section along line A—A. The central tubular area 11 of the airbag is advantageously relatively small in diameter and, when the airbag has been inflated, is closed again largely as a result of internal airbag pressure to a great extent by tubular walls striving toward each other, so that the protective function is performed just as it is with a conventional balloon-shaped air bag.

Because of its stationary mounting the ornamental cap 21, for example, may be used to advantage for mounting of operating and design elements, such as pushbuttons, wooden trim, etc. For example, the ornamental cap 21 may be used in this instance in its function of emblem backing for mounting a corporate logo; such logo may either he integrated into the ornamental cap 21 or may be glued onto the ornamental cap 21 as a separate component.

In addition, but as is not illustrated here, there may be formed below the annular gap freed in the event of airbag activation an annular exit channel which is defined by channel walls. The exit behavior of the airbag may be influenced at the same time in a predetermined manner by specific shaping of those channel walls. For example, a conical narrowing may be provided in the annular exit channel.

What is claimed is:

1. A passenger protection device on a steering wheel of a vehicle with a steering wheel airbag module, the steering wheel airbag module being mounted behind a hub cover and containing at least one folded airbag and at least one gas generator, the hub cover having a stationary center area as first wall area about which is mounted a second wall area directly joined to the first wall area by an edge connection area, it being possible for an annular gap to be formed around the stationary center area in the second wall area in an event of airbag activation, the airbag being correspondingly annular in form with a tubular area associated with the annular gap and emerging from such gap when the airbag is in an inflated state, and it being possible for the annular gap to be formed immediately around the stationary center area in the event of airbag activation as a result of expansion and opening of at least the edge connection area of the second wall area, characterized in that the edge connection area of the second wall area is clamped to the stationary center area when the passenger protection device has not been activated, and the edge connection area is extracted from the clamping by the airbag during inflation and is expanded and opened around the stationary center area for formation of the annular gap.

2. The passenger protection device as claimed in claim 1, wherein the stationary center area rests by a center edge area on the edge connection area of the second wall area and wherein the edge connection area is clamped between the center edge area and a clamping element.

3. The passenger protection device as claimed in claim 2, wherein the clamping element clamps the edge connection area.

4. The passenger protection device as claimed in claim 2, wherein the stationary center area is laminar in form and may be fastened to a central and substantially vertically oriented pin extension on the airbag module, and the clamping element is in the shape of a trough with a trough edge as clamping element edge area and has a central opening through which the pin extension of the stationary center area extends effecting positive locking.

5. The passenger protection device as claimed in claim 1, wherein the stationary center area has on a circumferential surface a circumferential groove into which the edge connection area of the second wall area may be snapped in such a way that the edge connection area is extracted from the circumferential groove by the inflating airbag and is expanded and opened by the inflating airbag to form the annular gap around the center element.

6. The passenger protection device as claimed in claim 1, wherein the stationary center area rests on the airbag module for orientation with feet and wherein the stationary center area is fastened by way of a central and substantially vertically oriented pin extension on the airbag module housing.

7. The passenger protection device as claimed in claim 1, wherein at least one of:
the first wall area forming the stationary center area and surrounded by the annular gap is rigidly connected to the airbag module and
at least one part of a housing-wall of the airbag module forms the stationary center area as visible surface.

8. The passenger protection device as claimed in claim 1, wherein the annular gap is substantially circular in form and encloses a first wall area in the form of a substantially circular surface as stationary center area.

9. The passenger protection device as claimed in claim 1, wherein the annular gap which may be formed in the event of airbag activation in the second wall area is bounded by an edge area of an ornamental cap, in such a way that this edge area may be bent outward by an airbag forcing its way out of the annular gap to enlarge the annular gap and to form a guide surface.

10. The passenger protection device as claimed in claim 1, wherein there is formed below the annular gap an annular exit channel which is bounded by channel walls a shape of which is adapted to a predetermined exit behavior of the airbag.

11. The passenger protection device as claimed in claim 1, wherein the stationary center area is formed by a stationary ornamental cap.

12. The passenger protection device as claimed in claim 1, wherein there is introduced below the stationary center area an insulating material and wherein the second wall area is at least in part in the form of a leather cover.

13. The passenger protection device as claimed in claim 3, wherein the stationary center area is laminar in form and may be fastened to a central and substantially vertically oriented pin extension on the airbag module, and the clamping element is in the shape of a trough with a trough edge as clamping element edge area and has a central opening through which the pin extension of the stationary center area extends effecting positive locking.

14. The passenger protection device as claimed in claim 4, wherein the stationary center is fastened on a diffusor on the airbag module.

15. The passenger protection device as claimed in claim 6, wherein the stationary center area rests on the airbag module for orientation with feet and wherein the stationary center area is fastened by way of a central and substantially vertically oriented pin extension on the airbag module housing.

16. The passenger protection device as claimed in claim 15, wherein the stationary center area rests on a diffusor on the airbag module.

17. The passenger protection device as claimed in claim 6, wherein the stationary center area is fastened by means of a threaded connection.

18. The passenger protection device as claimed in claim 9, wherein the ornamental cap is in the form of a cover as the stationary center area.

19. The passenger protection device as claimed in claim 12, wherein the insulating material is a foam material.

* * * * *